Patented Nov. 4, 1941

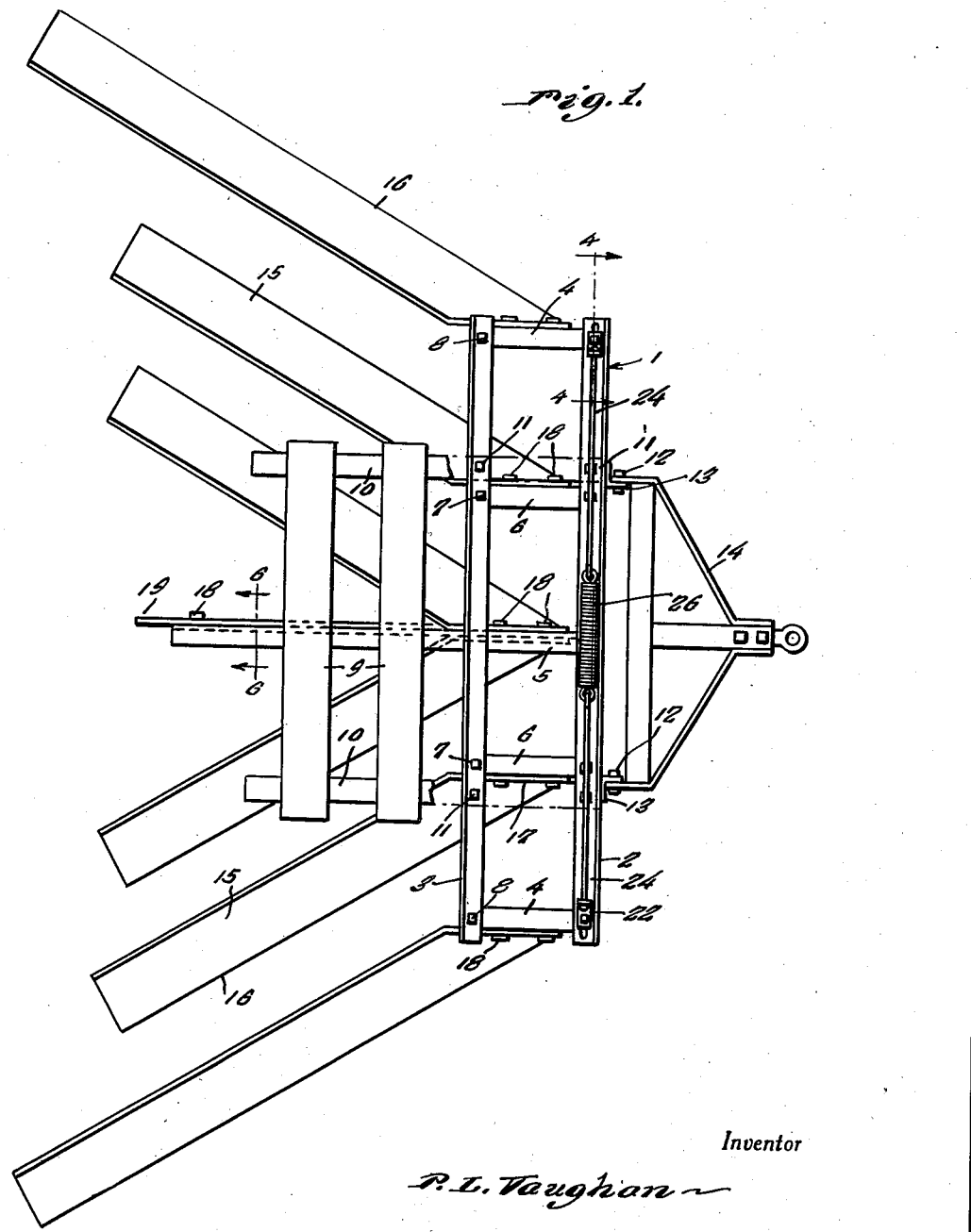

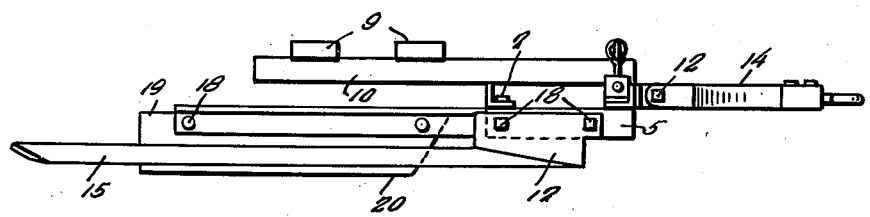
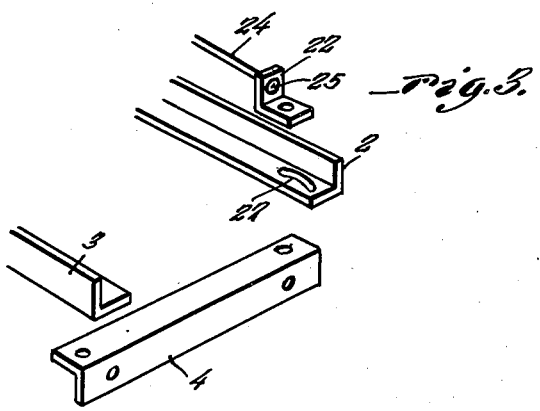
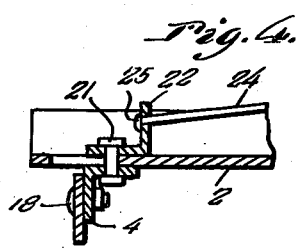
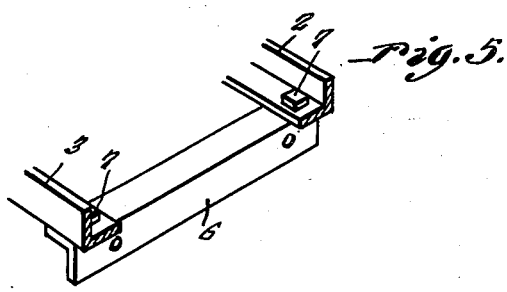
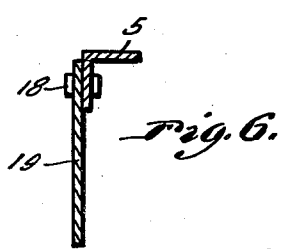

2,261,599

UNITED STATES PATENT OFFICE 2,261,599

WEED CUTTER

Paschal L. Vaughan, Kingsburg, Calif.

Application September 26, 1939, Serial No. 296,661

1 Claim. (Cl. 97—169)

My invention relates to improvements in combined weed-cutting and ground-working implements.

The principal object in view is to provide an efficient device of this character equipped for cutting weeds, under overhanging vines, or plants, particularly between rows and in lanes without damaging the vines or trees, and which is adapted to mulch the ground thereby functioning as a cultivator.

Another object is to provide a device of the character and for the purpose above set forth which is of the drag type and adapted under draft to maintain a straight course without steering.

Other and subordinate objects are also comprehended by my invention, all of which, together with the precise nature of my improvements, will be readily understood when the succeeding description and claim are read with reference to the drawings accompanying and forming part of this specification.

In said drawings—

Figure 1 is a view in top plan of a preferred embodiment of my invention,

Figure 2 is a view in side elevation,

Figure 3 is a fragmentary view in perspective of parts of the main frame disassembled and drawn to an enlarged scale, Figure 4 is a fragmentary view in section taken on the line 4—4 of Figure 1 looking in the direction indicated by the arrows and drawn to an enlarged scale, Figure 5 is a fragmentary perspective view of the main frame partly shown in section, and Figure 6 is a detail sectional view taken on the line 6—6 of Figure 1 and drawn to an enlarged scale.

Referring to the drawings by numerals, the illustrated embodiment of my invention comprises an elongated rectangular angle iron frame 1 disposed lengthwise across the device and embodying front and rear bars 2 and 3, respectively, end cross-bars 4, a central cross-bar 5, and a pair of cross-bars 6 intermediate the end bars 4 and the central cross-bar 5, respectively. The bars 5 and 6 are rigidly bolted, as at 7, to the bars 2 and 3. The end bars 4 are pivotally connected at the rear ends thereof, as at 8, to the rear bar 3 and the central bar 5 is longer than the bars 4 and 6 and trails the frame 1 for a substantial distance. The described bars 4, 5 and 6 are located on the undersides of the bars 2 and 3. In the rear of the frame 1 is a skeleton platform for the operative comprising a pair of suitable planks 9 mounted in any desired manner parallel with the frame 1 upon a pair of angle iron bars 10 secured, as at 11, to the frame 1 to extend rearwardly of the frame 1. Pivoted, as at 12, to angle brackets 13 on the front bar 2 of frame 1 is a forwardly extending vertically swingable draft yoke 14 for coupling the device to a tractor or for hitching draft animals to the device.

The frame 1 serves as a header for a plurality of trailing, flat, cutter bars, or blades, 15 extending obliquely rearwardly and outwardly on opposite sides of the central bar 5. Each of said bars 15 is of elongated form and suitable metal and is provided with a front cutting edge 16 and an upstanding oblique front end 17 for bolting, as at 18, to the bars 4, 5, 6, as the case may be, so that said cutting bars are disposed in a common horizontal plane below the level of the frame 1, the arrangement being such that said cutting bars 15 are tilted transversely, forwardly and downwardly so that the cutting edges 16 thereof will bite into the ground and cut weeds below the same. A pair of described cutting bars 15 are bolted to the central bar 5 to extend rearwardly in divergent relation from opposite sides of said bar 5. Another pair is similarly secured to the intermediate cross-bars 6, respectively, upon opposite sides of the first-mentioned pair, respectively, and in similarly divergent relation. A third and longer pair, constituting an outside pair, are similarly secured to the end cross-bars 4 upon opposite sides of the second-mentioned pair, respectively, also in similarly divergent relation, said last pair being preferably longer than the others. All of the cutting bars 15 on opposite sides of bar 5 are parallel and equidistantly spaced apart laterally.

Bolted, as at 18, to the central cross-bar 5, in the rear of the frame 1, is an elongated keel plate 19 trailing the frame 1 endwise and having a front beveled end 20 for riding over the ground and a ground-engaging straight lower edge extending below the level of the cutting bars 15.

As previously stated, the end cross-bars 4 are pivoted to the bar 3 of frame 1. This is for the purpose of providing for swinging movement of the outermost, or outside, cutting bars 15 inwardly under accidental engagement of the cutting edges 16 thereof with plants to avoid cutting the latter down.

Provision is made for tensioning the front ends of said cross-bars 4 so that said outermost cutting bars 15 are yieldingly held in outermost positions, said means comprising the following: The front ends of the cross-bars 4 are equipped with bolts, as at 21, extending through short longitudinal slots in the front bar 2 of the frame 1 and brackets 22 on the upper ends of said bolts sliding on top of said bar 2. A pair of tie rods 24 are suitably connected, as at 25, at outer ends thereof to said brackets 22, respectively, the inner ends of said rods being connected by a coil spring 26. The slots, designated 27, may be suitably arcuate, as will be understood, to compensate for swinging movement of the bolts 21. Outward movement of the outermost cutting bars 15 is limited by coaction of the bolts 21 with the inner ends of the slots 27.

In the use of the described cutting and groundworking implement, the same is pulled along the ground between rows, as will be understood. Under forward travel thereof, the cutting edges 16 of the cutting bars, or blades, 15 will bite into the ground and cut weeds below the ground level, or, at least, close to the ground. By virtue of the described oblique arrangement of the cutting bars 15, a draw cut is effected by each as will be apparent. In the course of travel of the implement, the keel plate 19 will bite edgewise into the ground and maintain the implement in a straight course. As the cutting bars, or blades, 15 traverse the ground, they effect a mulching action on the same. In a tight place, the outermost cutting bars 15, yield inwardly in the manner and for the purpose alreday set forth.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

In an implement of the class described, a drag frame, including a centrally located elongated frame member, an elongated keel plate secured to said frame member at the side thereof in subjacent position to trail the frame lengthwise, a pair of elongated cutting blades beneath the frame having front ends attached to said frame member and extending rearwardly upon opposite sides of the plate, respectively, in diverging relation to be drawn substantially flat over the ground with outer side edges leading whereby said blades are arranged to effect a draw cut, a second pair of similar blades extending rearwardly from opposite sides of the frame in rearwardly diverging relation in the plane of the pair first-mentioned, the blades of the second pair being longer than those of the pair first mentioned, and means to attach the second pair of blades to said frame for yielding swinging movement inwardly, comprising a pair of bars at opposite sides of said frame, respectively, pivotally mounted at one end thereof for swinging movement outwardly and inwardly of the frame and on which the blades of said second pair are mounted, respectively, and means yieldingly connecting the other ends of said bars including a coil spring intermediate said bars, and a pair of rods extending between opposite ends of said spring and said other ends of said bars.

PASCHAL L. VAUGHAN.